March 6, 1962

B. A. BUSS 3,023,597

COMBINED WASHER AND CENTRIFUGE HAVING COMMON
MEANS TO CHANGE SPEED AND
OPERATE VALVE

Filed March 7, 1961

INVENTOR
BENJAMIN ALVIN BUSS

BY
Robertson and Smythe
ATTORNEYS

March 6, 1962

B. A. BUSS 3,023,597

COMBINED WASHER AND CENTRIFUGE HAVING COMMON
MEANS TO CHANGE SPEED AND
OPERATE VALVE

Filed March 7, 1961

INVENTOR
BENJAMIN ALVIN BUSS
BY
Robertson ay Smythe
ATTORNEYS

United States Patent Office 3,023,597
Patented Mar. 6, 1962

3,023,597
COMBINED WASHER AND CENTRIFUGE HAVING COMMON MEANS TO CHANGE SPEED AND OPERATE VALVE
Benjamin Alvin Buss, East Moline, Ill., assignor to American Machine and Metals, Inc., East Moline, Ill., a corporation of Delaware
Filed Mar. 7, 1961, Ser. No. 94,068
8 Claims. (Cl. 68—24)

The present invention relates to laundry washing machines, and particularly to a new and improved drive and dump valve operating mechanism therefor.

Prior known washing machines employ many varied means of operating the dump valve for the washing drum. These devices may include solenoid operators that may be controlled from a timer controller. Such arrangements are costly and may fail to function properly should the timer controller become out of phase.

The principal object of this invention is to provide a laundry washing machine having a variable speed drive and a dump valve operator responsive to the adjustment of the variable speed drive.

Another object of the invention is to provide such a laundry washing machine in which the operation of the dump valve will always occur at the correct speed of the laundry drum.

Still another object of the invention is to provide such a laundry machine with an inexpensive combined variable speed drive and dump valve.

In one aspect of the invention, a clothes container of a laundry machine may be mounted within a frame for rotation about a horizontal axis. This container may be of usual form having a door aligned with the axis of rotation of the container and the usual water inlet and drains that are common to such laundry machines. A variable speed belt drive may be provided for rotating the clothes container, and it may be mounted on a base that is rigidly attached to the main frame. There may be an electric motor mounted at one end of the base having a fixed diameter V-groove pulley on its output shaft. There also may be a fixed diameter V-groove pulley system at the opposite end of the base. Between the two ends of the base may be located a pivotally mounted arm supporting an expansible V-groove pulley system that is belted to the motor pulley and to the pulley system at the other end of the base. The expansible pulley system may include two opposed conical flanges fixed in spaced relation to a sleeve journaled on a shaft. Between the two flanges may be a conical surfaced element splined to the sleeve so that it may move toward and away from the opposed fixed conical flanges. The conical surfaces of the splined element form V-grooves with the respective fixed conical flanges.

In another aspect of the invention, the pivotal mounting for the expansible pulley system may include a pivotally mounted nut that is threaded onto a rotatable screw that is selectively driven by an electric motor also mounted on the base for the variable speed drive.

In still another aspect of the invention, an oscillatable dump valve may be provided for emptying the container of water when the washing and/or rinsing operation has been completed. The dump valve may be closed in one of its oscillatable positions and opened in another oscillatable position. A flexible cord, chain or belt may be attached to the oscillatable dump valve and may be anchored to a frame member of the machine with a tensioning means that normally maintains the valve in a closed position against a positive stop. Another flexible cord, chain or belt may also be connected to the valve and it may be connected also to a pivotal linkage that cooperates with the pivotal arm that supports the expansible V-groove pulley system.

In still another aspect of the invention, limit switches may be provided at each extremity of the oscillatable motion of the support for the expansible V-belt drive for de-energizing the adjusting motor therefor.

The above, other objects and novel features of the invention will become apparent from the following specification and accompanying drawings which are merely exemplary.

Figure 1:
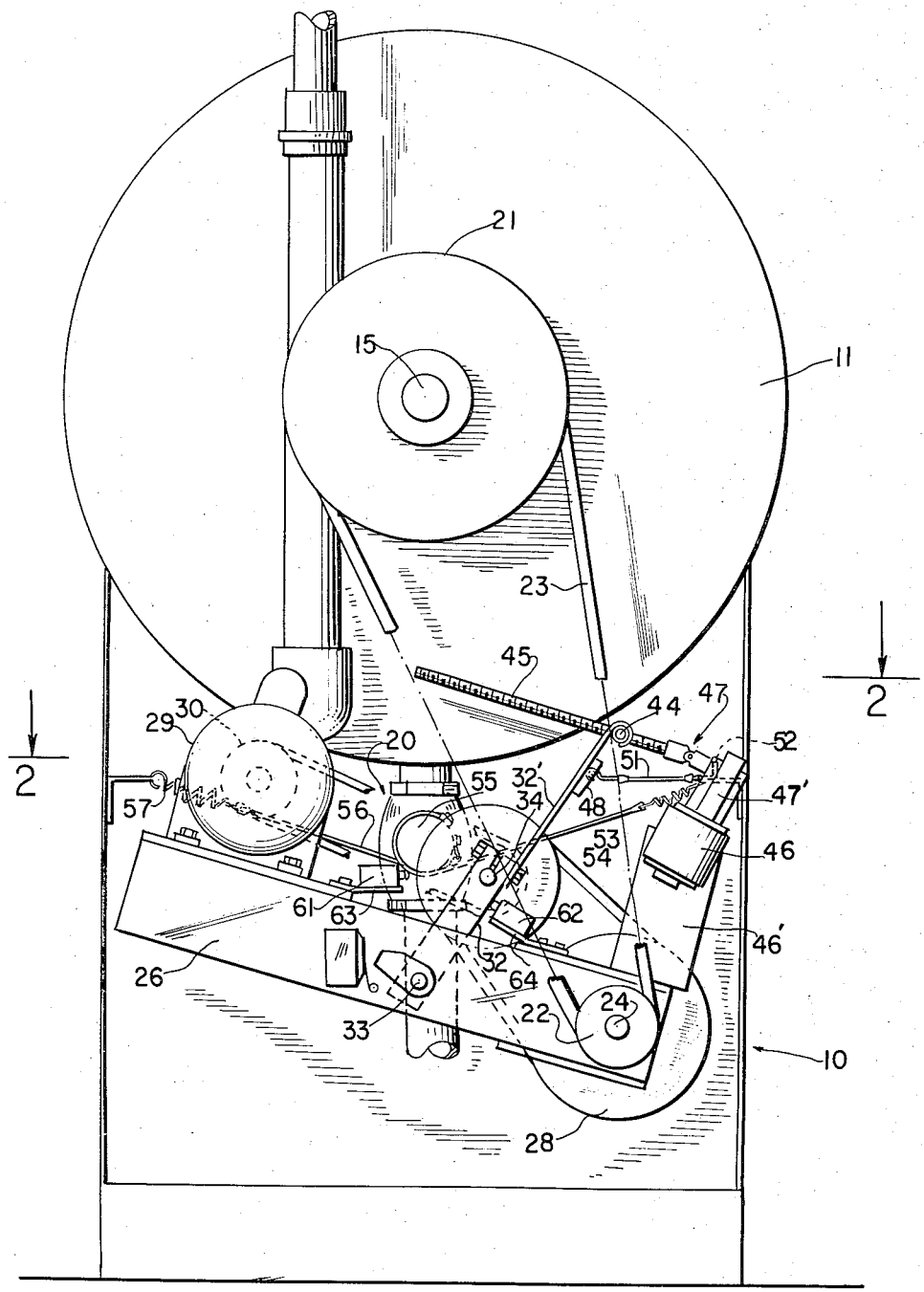
FIG. 1 is a back elevational view of a laundry machine to which the principles of the invention have been applied.
Figure 3:
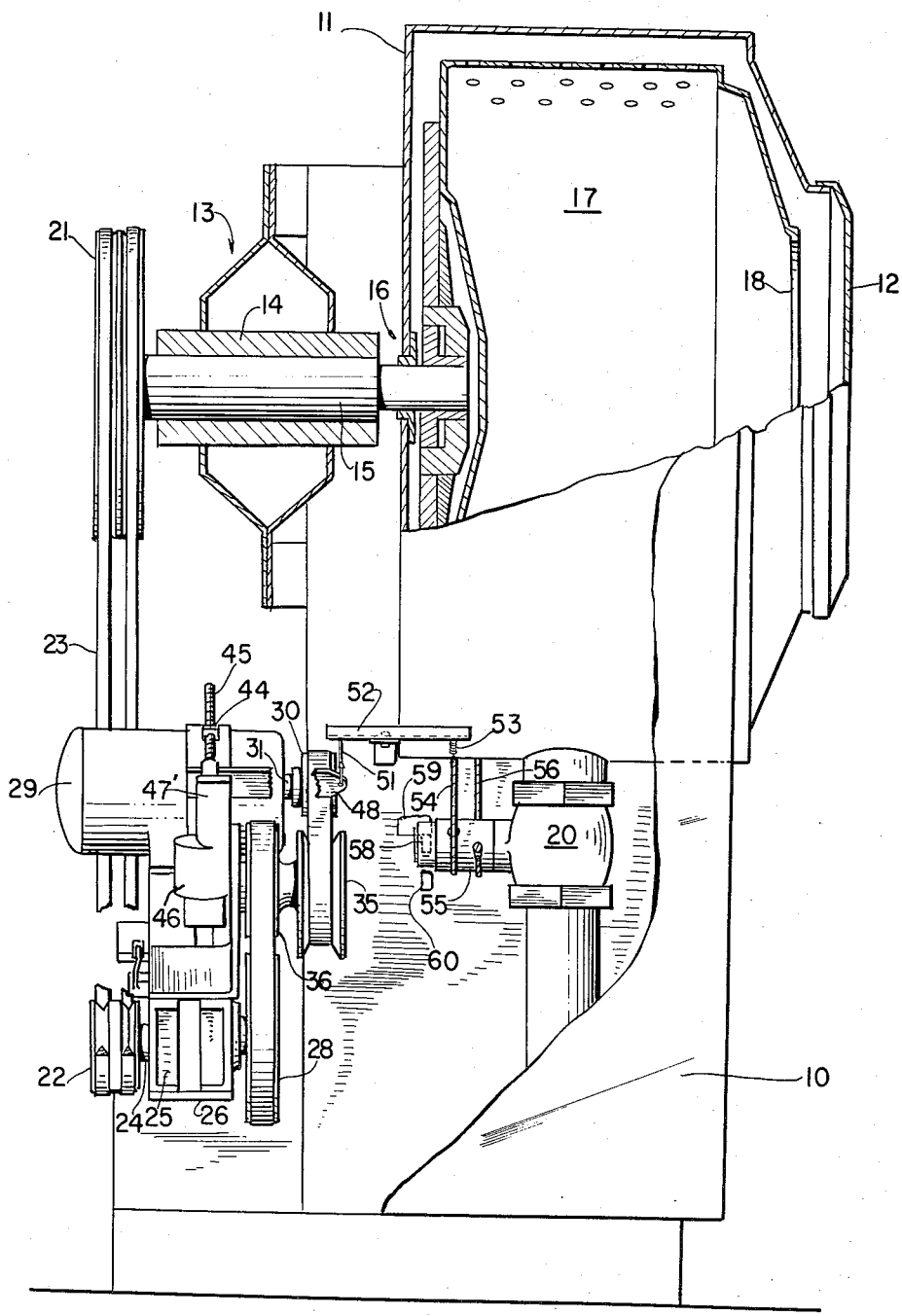
FIG. 3 is a side elevational view of the machine of FIG. 1.

Referring to the drawings, and particularly to FIGS. 1 and 3, the principles of the invention are shown as applied to a laundry machine including a frame 10 having a cylindrical housing 11. The housing 11 may be provided with the usual pivotally mounted door 12. The frame 10 may include a bracket 13 that supports a bearing 14 in axial alignment with the cylindrical housing 11. A shaft 15 may be journaled in bearing 14 and its one end may extend through seals 16 formed in the wall of housing 11 opposite that containing the door 12. A cylindrical clothes container 17 may be attached to shaft 15 within housing 11, and it may include an open mouth portion 18 axially aligned with and adjacent to the door 12. The usual inlet and drain may be provided for the machine, the latter including a dump valve 20.

The shaft 15 may have a constant diameter V-groove pulley 21 fixed to its end opposite that supporting container 17. Pulley 21 is connected to a constant diameter V-groove pulley 22 through V-belts 23. The pulley 22 is fixed to a shaft 24 that is journaled in a bearing 25 mounted at one end of a base 26 that is supported by the frame 10.

The end of shaft 24 opposite that to which V-groove pulley 22 is fixed may fixedly support another V-groove pulley 28 of constant diameter. An electric motor 29 may be fixed to the end of base 26 opposite that supporting bearing 25, and it may have a fixed diameter V-groove pulley 30 keyed to its output shaft 31. Intermediate the motor 29 and the bearing 25 on base 26, there may be mounted an arm 32 on a pivot 33. The upper end of arm 32 may fixedly support a shaft 34.

Figure 2:
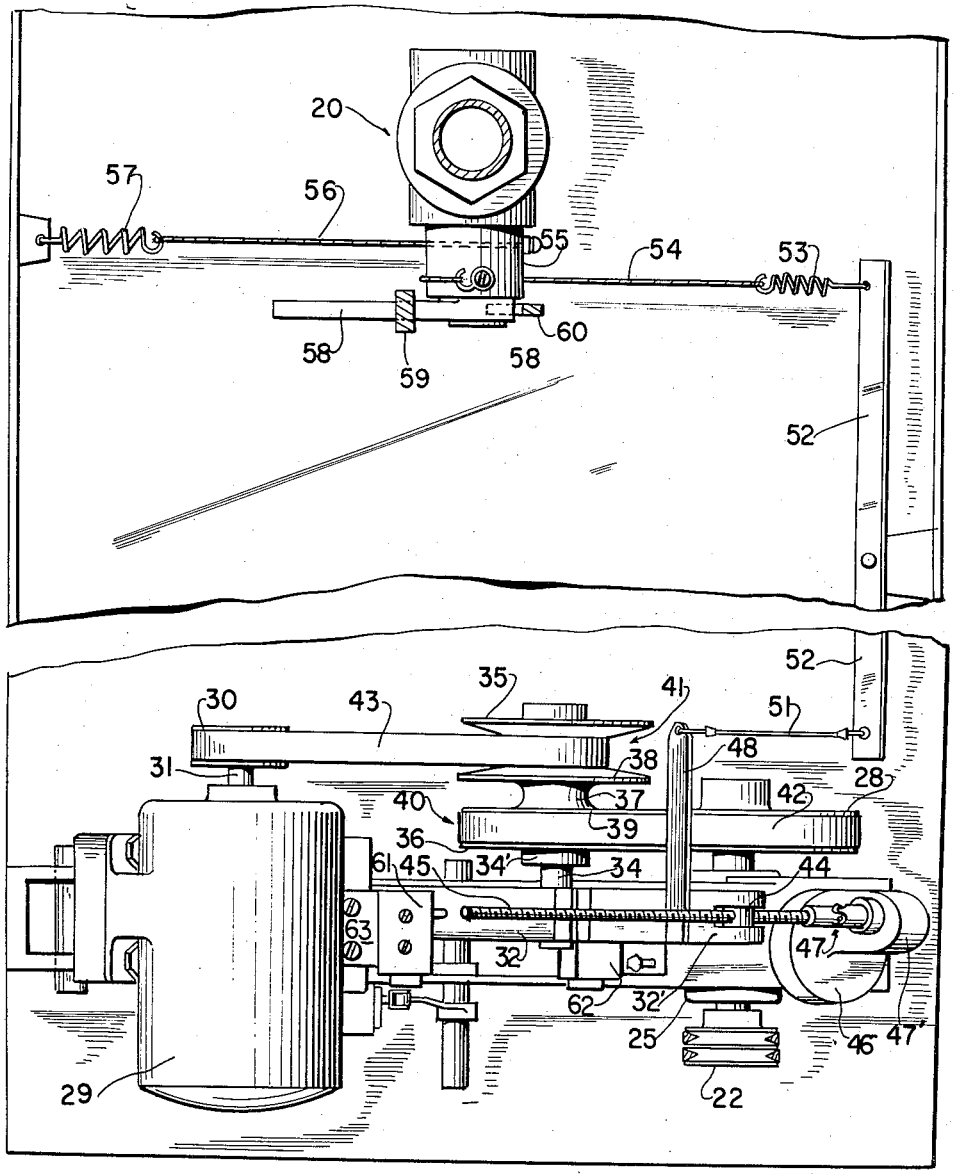
FIG. 2 is a sectional plan view taken substantially along line 2—2 of FIG. 1.

Referring to FIG. 2, shaft 34 may have journaled on it a sleeve 34' to which is fixed opposed conical disks 35 and 36. Between disks 35 and 36, there may be a member 37 mounted on sleeve 34'. The member 37 may be provided with conical surfaces 38 and 39 which, respectively, form with disks 35 and 36 expansible V-groove pulleys 40 and 41. V-beling 42 may connect pulley 40 with constant diameter pulley 28; and, V-belting 43 may connect pulley 41 with constant diameter pulley 30.

A rigid extension 32' is fixed to arm 32 and it supports a threaded nut 44 within a bifurcated end portion. The nut 44 threadingly receives a rotatable screw 45. The screw 45 may be connected to the output shaft of a reversible electric motor 46 through a universal joint 47 and a worm and worm wheel drive 47'. The motor 46 may be mounted on a bracket 46' fixed to the base 26. By energizing the motor 46, the arm 32 can be made to pivot about the point 33 to cause the expansible pulley system including pulleys 40 and 41 to move toward and from either of the fixed diameter pulleys 28 and 30.

In order to actuate the dump valve 20 in response to the variation in speed of the container 17 and at a predetermined speed thereof, means has been provided that cooperates with the pivotal arm 32. In the embodiment disclosed, this means may comprise an arm 48 fixed to the extension 32' of arm 32. A flexible cord, belt or chain 51 has its one end fixed to the free end of arm 48, and the opposite end of which is connected to one end of a pivotal lever 52.

Referring to FIG. 2, the opposite end of lever 52 is connected to a spring 53 which in turn is connected to another flexible cord, chain or belt 54. The chain 54 wraps around a cylindrical drum 55 fixed to the dump valve 20. Another flexible chain, cord or belt 56 may also wrap partially around the drum 55 and may extend to a frame member on the opposite side of the machine from that supporting lever 52. A spring 57 may be provided between chain 56 and the frame member, and it may be substantially stronger than spring 53.

An arm 58 may also be attached to the drum 55, and positive abutments 59 and 60 may be provided for limiting the oscillatable movement of the valve 20 between its open and closed positions.

Referring again to FIG. 1, switches 61 and 62 may be mounted on frame 26 on brackets 63 and 64 which serve as positive stops limiting the pivotal movement of the arm 32 after the switches 61 and 62 are actuated by the arm 32 itself.

With the apparatus in the condition shown in the drawings, the valve 20 is closed, and the container 17 may be rotating at a slow washing speed. Upon completion of the washing cycle, the control timer may energize motor 46, causing arm 32 to move in a counter-clockwise direction. As the speed of the container increases a predetermined number of revolutions per minute, which can be effectively preset by adjustment of the chain 51, the movement of arm 48 causes lever 52 to move clockwise which effects the rotation of drum 55 against the action of spring 57 and moves arm 58 to its vertical position against positive stop 60, thereby opening dump valve 20. Continued counterclockwise movement of arm 32 causes the expansible pulley 40 to increase the speed of container 17 to its spin speed, and further movement of arm 48 merely extends the spring 53.

When the container 17 is at its spin speed, switch 61 is actuated and bracket 63 acts as a positive abutment preventing further counterclockwise motion of arm 32. Actuating switch 61 may de-energize motor 46. When the spinning cycle has been completed, the main timer control of the laundry machine may energize motor 46 to cause it to rotate reversely, thereby turning arm 32 in a clockwise direction and reducing the speed of container 17. When the speed of container 17 has been reduced to the slow washing speed, the arm 32 is in the position shown in FIG. 1. By virtue of the stronger spring 57 returning drum 55 to a position where arm 58 engages the positive stop 59, the valve 20 is closed and ready for another cycle of operation after the container is again supplied with water.

Although the various features of the new and improved variable speed drive and dump valve control have been shown and described in detail to fully disclose one embodiment of the invention, it will be evident that changes may be made in such details and certain features may be used without others without departing from the principles of the invention.

What is claimed is:

1. In a laundry machine, a container; variable speed means for rotating said container; a housing enclosing said container; a dump valve for said housing; oscillatable means for varying the speed of said variable speed means; and means responsive to the oscillatable motion of said means for opening and closing said dump valve.

2. In a laundry machine, a container; variable speed means for rotating said container; a housing enclosing said container; a dump valve for said housing; oscillatable means for operating said dump valve; other oscillatable means for varying the speed of said variable speed means; and means responsive to the oscillatable motion of said other means for operating the oscillatable means that operates said dump valve.

3. In a laundry machine, a container; variable speed means for rotating said container; a housing enclosing said container; a dump valve for said housing; oscillatable means for operating said dump valve; other oscillatable means for varying the speed of said variable speed means; and overtravel means responsive to the oscillatable motion of said other oscillatable means for operating the oscillatable means that operates said dump valve.

4. In a laundry machine, a container; an expansible pulley means for driving said container at varying speeds; a housing for said container; a dump valve for said housing; a pivotally mounted arm for supporting said expansible pulley means; power means for oscillating said arm to vary the speed at which said expansible pulley means rotates said container; resilient means normally urging said dump valve to a closed position; and other resilient means adapted to cooperate with said pivotally mounted arm for causing said dump valve to open during a portion of the pivotal movement of said arm.

5. In a laundry machine, a container; an expansible pulley means for driving said container at varying speeds; a housing for said container; a dump valve for said housing; a pivotally mounted arm for supporting said expansible pulley means; power means for oscillating said arm to vary the speed at which said expansible pulley means rotates said container; a flexible line including a spring connected to said dump valve and to a stationary member tending to resiliently urge said valve to a closed position; and another flexible line including a spring of less strength than said first mentioned spring connected to a pivoted lever adapted to cooperate with said arm for causing said valve to open during a portion of the movement of said arm.

6. In a laundry machine, a container; an expansible pulley means for driving said container at varying speeds; a housing for said container; a dump valve for said housing; a pivotally mounted arm for supporting said expansible pulley means; power means for oscillating said arm to vary the speed at which said expansible pulley means rotates said container; a flexible line including a spring connected to said dump valve and to a stationary member tending to resiliently urge said valve to a closed position; another flexible line including a spring of less strength than said first mentioned spring connected to a pivoted lever adapted to cooperate with said arm for causing said valve to open during a portion of the movement of said arm; and positive stop means for limiting the movement of said valve at its open and closed positions.

7. In a laundry machine, a container; an expansible pulley means for driving said container at varying speeds; a housing for said container; a dump valve for said housing; a pivotally mounted arm for supporting said expansible pulley means; power means for oscillating said arm to vary the speed at which said expansible pulley means rotates said container; a flexible line including a spring connected to said dump valve and to a stationary member tending to resiliently urge said valve to a closed position; another flexible line including a spring of less strength than said first mentioned spring connected to a pivoted lever adapted to cooperate with said arm for causing said valve to open during a portion of the movement of said arm; and switch means for de-energizing said power means at each end of the pivotal movement of said bar and for positively stopping the movement of said bar.

8. In a laundry machine, a container; an expansible pulley means for driving said container at varying speeds; a housing for said container; a dump valve for said housing; a pivotally mounted arm for supporting said expansible pulley means; power means for oscillating said arm to vary the speed at which said expansible pulley means rotates said container; a flexible line including a spring connected to said dump valve and to a stationary member tending to resiliently urge said valve to a closed position; another flexible line including a spring of less strength than said first mentioned spring connected to a pivoted lever adapted to cooperate with said arm for causing said valve to open during a portion of the movement of said arm; positive stop means for limiting the movement of said valve at its open and closed positions; and switch means for de-energizing said power means at each end of the pivotal movement of said bar and for positively stopping the movement of said bar.

References Cited in the file of this patent

UNITED STATES PATENTS

| | | |
|---|---|---|
| 2,920,493 | Pender | Jan. 12, 1960 |
| 2,972,510 | Buss et al. | Feb. 21, 1961 |